Nov. 27, 1934.  A. C. ANDERSON ET AL  1,982,041
BRAKE TESTING APPARATUS
Filed Feb. 6, 1933  2 Sheets-Sheet 1
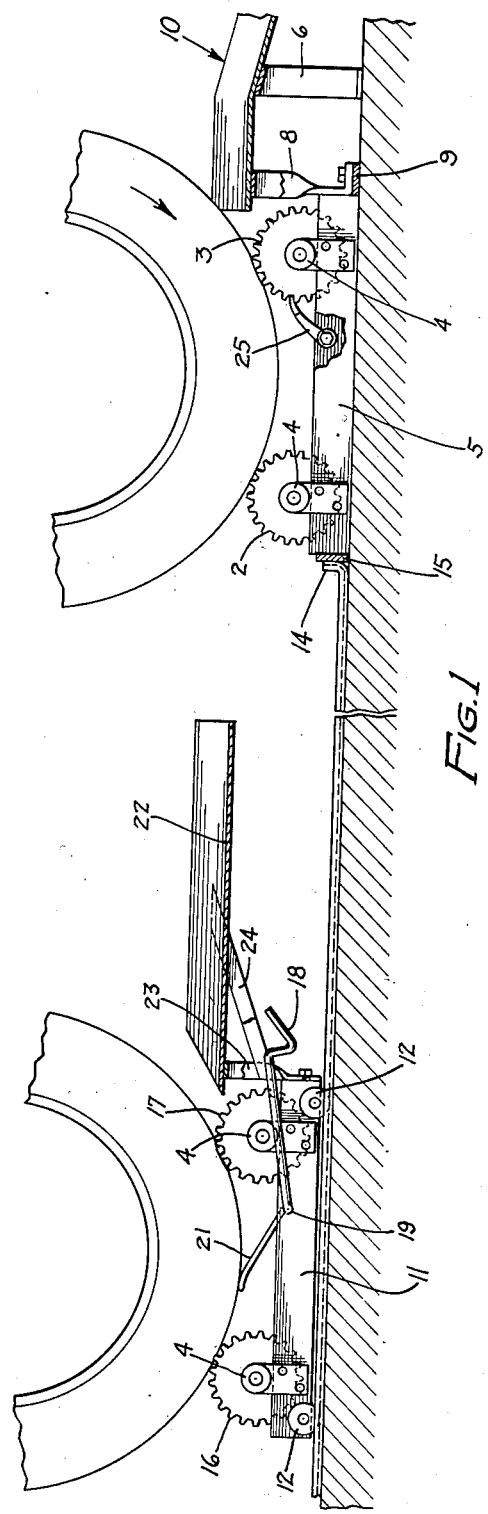
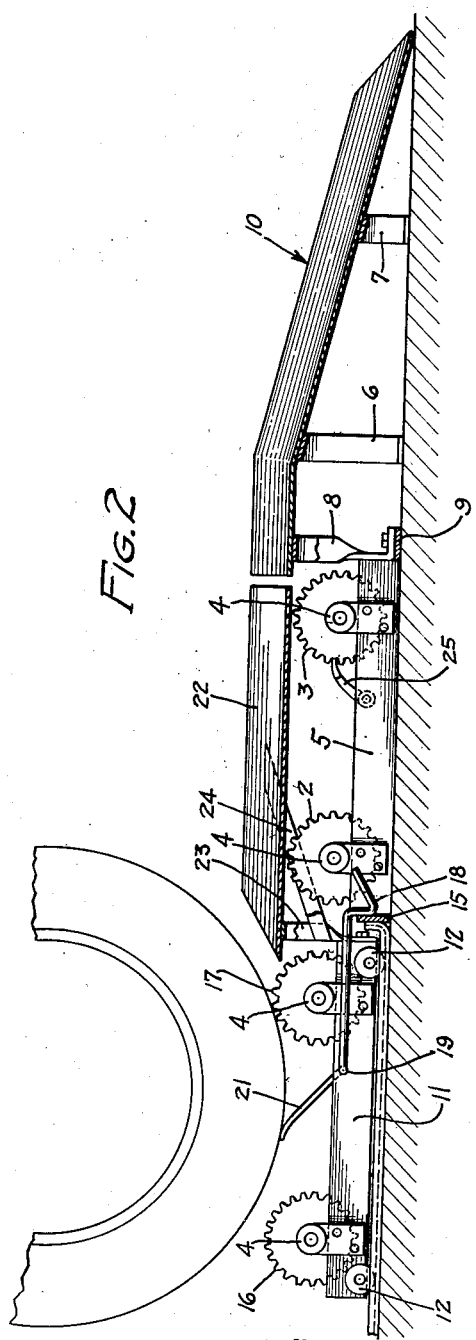
INVENTORS
ADELBERT C. ANDERSON
WALLACE R. STRANDBERG
BY Paul, Paul + Moore
ATTORNEYS.

Nov. 27, 1934.  A. C. ANDERSON ET AL  1,982,041
BRAKE TESTING APPARATUS
Filed Feb. 6, 1933    2 Sheets-Sheet 2

INVENTORS
ADELBERT C. ANDERSON
WALLACE R. STRANDBERG
BY
Paul, Paul & Moore
ATTORNEYS.

Patented Nov. 27, 1934

1,982,041

UNITED STATES PATENT OFFICE 1,982,041

BRAKE TESTING APPARATUS

Adelbert C. Anderson and Wallace R. Strandberg, St. Paul, Minn., assignors to Straight Stop Corporation, St. Paul, Minn., a corporation of Minnesota Application February 6, 1933, Serial No. 655,378

20 Claims. (Cl. 73—51)

This invention relates to new and useful improvements in apparatus for testing the brakes of motor vehicle wheels.

An object of the invention is to provide an improved brake testing apparatus adapted to support a vehicle in a position whereby the brake resistance of its brakes may readily and quickly be determined.

A further object is to provide a brake testing apparatus comprising a pair of rollers adapted to support a wheel of the vehicle, and a carriage adapted to support another wheel of the vehicle and mounted for traveling movement relatively to said rollers, said carriage normally being positioned adjacent to said rollers and having means for locking it against traveling movement when thus positioned, and a trip being provided upon the carriage adapted to be engaged by a wheel driven onto said carriage, whereby the carriage locking means is actuated to release the carriage to permit the latter to be advanced, or moved in a direction away from said rollers, by the traveling movement of the vehicle wheel supported on said carriage.

A further object is to provide an apparatus of the character described, comprising two sets of rollers adapted to support the rear wheels of a vehicle, and a pair of carriages adapted to receive and support the front wheels of the vehicle, and said carriages normally being positioned adjacent to said sets of rollers and each comprising a bridge member, which members are normally positioned over said sets of rollers to guide the front wheels of the vehicle thereover onto said carriages, and said bridge members being so disposed with relation to said sets of rollers that when positioned thereover, they will substantially engage the peripheries thereof, whereby said rollers will provide supports therefor.

Features of the invention reside in the means provided for locking the carriages in their normal positions, including the trip devices provided upon said carriages and adapted to be actuated by the vehicle wheels driven thereonto, whereby the latches associated therewith are operated to release said carriages; in the means provided for guiding the wheels of the vehicle onto and over certain of the wheel-supporting rollers of the apparatus; in the means for locking certain rollers of the apparatus against relative rotation in one direction, to permit the motor vehicle to be driven off the apparatus by its own power; in the means provided for rotating certain rollers of the apparatus to relatively rotate the vehicle wheels supported thereon, while their brakes set, whereby the brake resistance of each wheel brake may readily be determined; and in the simple and inexpensive construction of the entire apparatus, which comprises few parts, all of which are readily accessible.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Figure 1 is a longitudinal view on the line 1—1 of Figure 3, showing one of the carriages in an advanced position as when a vehicle is positioned on the apparatus, and also showing a wheel engaged with one of the trips;

Figure 2 is a view showing the carriage in its normal position with its bridge member positioned over the rear wheel supporting rollers associated therewith, and also showing the wheel about to actuate the trip to release the carriage;

Figure 3:
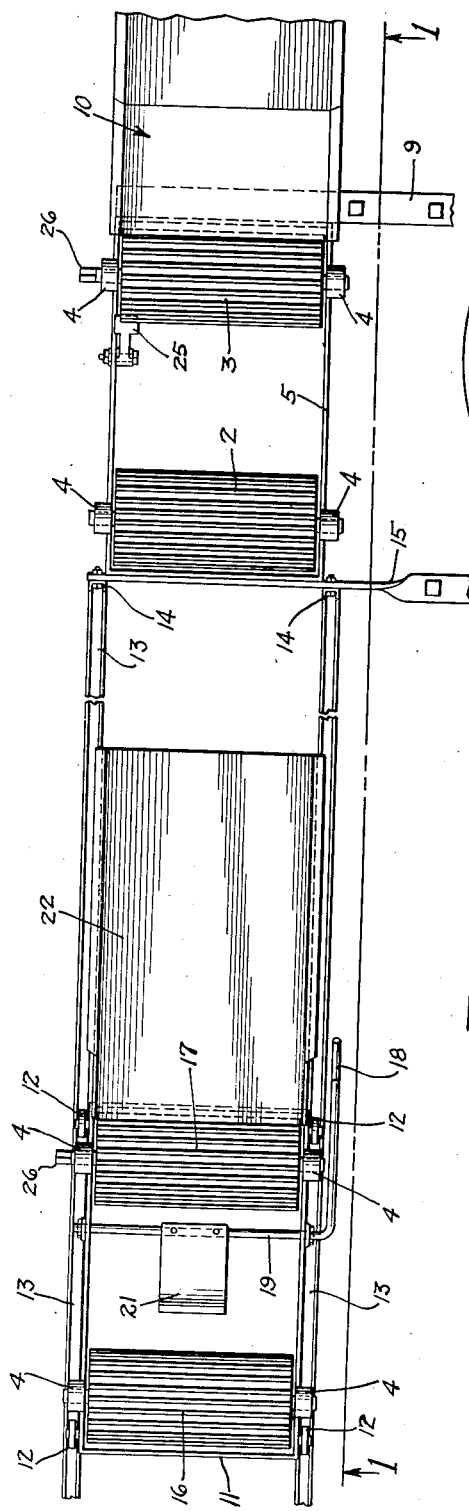
Figure 3 is a plan view of Figure 1.

The novel brake testing apparatus disclosed in this invention comprises a pair of rollers 2 and 3, preferably having their peripheries corrugated, as shown, to provide suitable traction surfaces adapted to be engaged by the peripheries of the vehicle wheel tires. The shafts of the rollers 2 and 3 are shown journaled in suitable brackets 4 mounted on a frame 5 adapted to be supported upon a floor, as shown. One such set of rollers is preferably provided for each rear wheel of the vehicle. An inclined plate 10 is provided at one end of each frame 5 and provides ramps for guiding the vehicle wheels onto the rollers 2 and 3. These plates or ramps may be supported upon suitable standards 6 and 7 engaging the floor, and upright brackets 8 which may be secured to the frames 5 and also to a suitable cross member or tie bar 9 which functions to secure together the frames 5 in spaced relation.

Means is provided for supporting the front wheels of the vehicle, and comprises a pair of carriages 11 provided with suitable anti-friction wheels or rollers 12 adapted to travel in suitable tracks 13, shown provided with upwardly bent end portions 14 adapted to be secured to a tie bar 15 which connects together the adjacent ends of the frames 5, as clearly shown in Figure 3. The rails are preferably secured to the floor by suitable means, not shown.

A pair of wheel supporting rollers 16 and 17 are mounted upon each carriage 11 adapted to receive and support the front wheels of the vehicle, as shown in Figure 1. As the carriages 11 are alike in construction, but one will be described in detail.

An important feature of the invention resides in the means provided for locking the carriage in its normal position adjacent to the frame 5, as shown in Figure 2. To thus lock the carriage against traveling movement, a latch 18 is mounted thereon which may consist of a rod bent at right angles to provide a cross shaft 19 mounted for rocking movement in suitable bearings provided in the side frame members of the carriage 11. A trip 21 is secured to the cross shaft 19 and is so positioned between the rollers 16 and 17, that when a wheel of the vehicle is driven onto the carriage, the periphery of the wheel will engage said trip 21 and thereby rock the shaft 19 and move the latch member 18 out of locking engagement with the tie bar 15, as will be clearly understood by reference to Figures 1 and 2.

When the carriage is in its normal position, as shown in Figure 2, the latch member 18 will be in locking engagement with the tie bar 15 whereby the carriage will be locked against traveling movement, so that the carriage cannot move forwardly when the vehicle wheel initially engages the roller 17 of the carriage, in the operation of driving the vehicle onto the apparatus. In Figure 2, the vehicle wheel is shown just as it passes over the roller 17 and engages the trip 21 to release the latch 18. In Figure 1, the wheel is shown supported upon the rollers 16 and 17 of the carriage, in which position the trip 21 is depressed so as to move the latch 18 out of locking engagement with the tie bar 15.

In the operation of driving the wheel onto the carriage 11, the wheel passes over the roller 17 and assumes a position upon the rollers 16 and 17, as shown in Figure 1, wherein the latch is released so that when the wheel is moved forwardly by the traveling movement of the vehicle, the wheel will cause the carriage to advance or move forwardly upon the tracks 13, as will readily be understood by reference to Figure 1. By this arrangement, the carriage will automatically adjust itself to the proper position with respect to the frame 5, so that when the rear wheel reaches a position upon the rollers 2 and 3, as shown in Figure 1, the front wheel of the vehicle will be supported upon the carriage.

Another feature of this invention resides in the means provided for guiding the front wheels of the vehicle over the rear set of rollers 2 and 3. Such means is clearly shown in Figures 1 and 2, and comprises a bridge member 22, preferably of U-shaped cross section, and supported upon the rear portion of the frame of the carriage 11 by suitable brackets 23 and brace members 24. The bridge member is preferably constructed of sheet metal and is so spaced from the floor, that when the carriage is in its normal position, as shown in Figure 2, the bridge member 22 will be positioned over the rollers 2 and 3 of the frame 5, and in close proximity to the peripheries of said rollers, and it will also be alined with the ramp 10.

When the bridge member 22 is thus positioned, and the vehicle wheel is moved out of engagement with the rollers 16 and 17, the latch member will automatically move into locking engagement with the tie bar 15 to secure the carriage 11 in its normal position, shown in Figure 2, in which position it will remain until the trip 21 is again engaged by a vehicle wheel to release the latch. The bridge member is so disposed with relation to the rollers 2 and 3 that when the wheel passes over said member, the weight of the wheel will be supported upon said rollers, as will be clearly understood by reference to Figure 2. When the carriage is moved forwardly or away from the frame 5 by the traveling movement of the wheel supported thereon, the bridge member will simultaneously move away from the rollers 2 and 3, as shown in Figure 1, whereby said rollers are exposed to receive the rear wheel of the vehicle.

Means is provided for locking the rear roller 3 of the frame 5 against relative rotation in one direction so as to permit the vehicle to be driven off the apparatus by its own power. Such a means is shown in Figures 1 and 2, and may consist of a dog 25 pivotally supported in the frame 5 and adapted to engage the corrugated periphery of the roller 3. When the brakes have been tested and the car is to be driven off the testing apparatus, the rear wheels of the vehicle will be rotated in the direction indicated by the arrow in Figure 1, whereby the wheel will move rearwardly onto the ramp 10, because of the roller 3 being locked against rotation. If the roller 3 were not locked as above stated, it would tend to idle when frictionally engaged by the vehicle wheel. As the rear vehicle wheel travels downwardly over the inclined ramp 10, the front wheel of the vehicle is moved rearwardly, whereby the carriage 11 will move simultaneously therewith until it assumes the position shown in Figure 2, wherein it will be noted that the bridge member 22 is supported over the rear set of rollers 2 and 3 of the frame 5, in position to be engaged by the front wheel, as the latter rolls over said bridge member and onto the inclined ramp 10.

The novel brake testing apparatus herein disclosed is very simple and inexpensive, as will readily be noted by reference to Figures 1 and 2. The carriages 11 are so mounted and constructed that they will be automatically moved forwardly by the traveling movement of the vehicle wheels to the position shown in Figure 1, in which positions the rear vehicle wheels will be operatively supported upon the rear sets of rollers 2 and 3.

Figure 4:
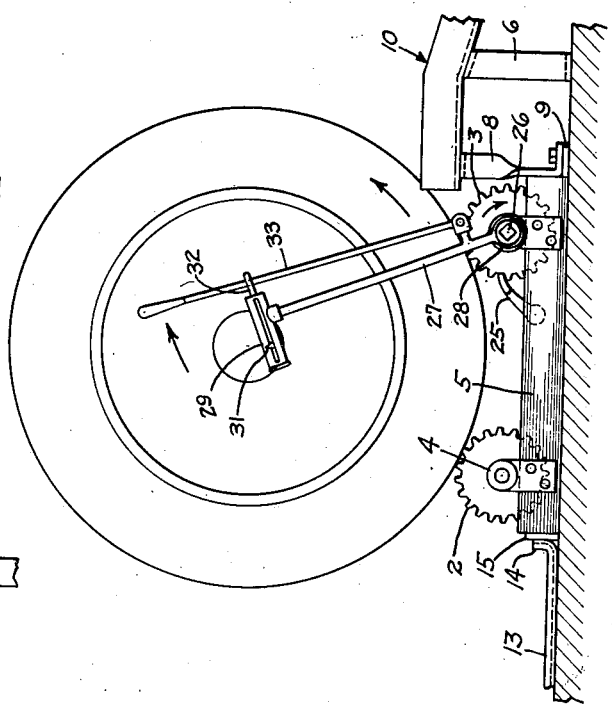
Figure 4 is a side elevation of a portion of the apparatus showing the means for locking one of the rollers against rotation in one direction, and also showing a means for operating the rollers to relatively rotate the vehicle wheels and determine the brake resistance of their brakes.

One roller of each set of rollers and also one roller of each carriage is provided with a square shaft terminal 26 adapted to be engaged by a ratchet device 28 provided at one end of an operating lever 27 of a suitable device for determining the brake resistance, as shown in Figure 4. The lever 27 is shown provided at its upper end with a suitable indicating means comprising a member 29 having a pointer 31 movably mounted therein and provided with a rod 32 operatively associated with an operating handle 33. This handle is pivoted to the lever 27 in spaced relation, as clearly shown in Figure 4.

When a wheel is positioned upon the rollers 2 and 3, and the lever 27 is operatively engaged with the roller 3, the operator will actuate the operating handle 33, whereupon the roller 3 will be rotated in the direction indicated by the arrow in Figure 4, and thereby cause the vehicle wheel to be relatively rotated upon said rollers against the resistance of the brake thereof. It will thus be noted that by oscillating the lever 33 back and forth, a rotary movement will be imparted to the roller 3 which, in turn, will rotate the vehicle wheel positioned thereon. Oscillation of the handle 33 will cause the roller 3 to rotate in the direction indicated by the arrow in Figure 4, whereupon the wheel will be rotated in the opposite direction or in a forward direction against the brake resistance of its brake, it being understood that the brake is set when the wheel is thus rotated to determine the brake resistance.

In testing the operation of the brake resistance of the vehicle brakes, the wheel brakes are tested independently of each other and adjusted until all of the brakes have been thus adjusted. The operating lever 33, including the means for determining the brake resistance may be quickly fitted onto and detached from the square shaft extensions 26 of the rollers, as will readily be understood by reference to Figures 3 and 4.

From the foregoing, it will be seen that the carriages 11 which support the front wheels of the vehicle, are automatically moved forwardly by the forward movement of the vehicle wheels, and when the brakes have been adjusted and the car is driven off the apparatus, the carriages will automatically return to their normal positions shown in Figure 2, by the traveling movement of the vehicle wheels. As soon as the front wheels move out of engagement with the trips 21, and onto the bridge members 22, the latch members 18 will automatically gravitate into locking engagement with the tie bar 15 to thereby secure the carriages against traveling movement.

In the drawings, we have referred to the rollers 2 and 3 as supporting the rear wheels of the vehicle, and the carriages 11 as supporting the front wheels thereof. It is to be understood, however, that if desired, the rear wheels may be supported upon the carriages 11 and the front wheels upon the rollers 2 and 3 of the frame 5, which may be desirable when adjusting the brakes of an automobile having a front wheel drive.

We claim as our invention:

1. In a brake testing apparatus, a carriage having movable elements mounted thereon adapted to support a wheel, means for locking the carriage against traveling movement, and means positioned to be engaged by a wheel driven onto said carriage whereby said locking means is rendered inoperative to permit the carriage to be advanced by said wheel.

2. In a brake testing apparatus, a carriage having means thereon adapted to support a vehicle wheel, means for locking the carriage against traveling movement, and means positioned between said wheel-supporting means and operatively connected with said locking means and adapted to be engaged by a wheel driven onto said carriage, whereby said locking means will be operated to release the carriage and permit the latter to be advanced by said wheel.

3. In a brake testing apparatus, a carriage having a pair of movable elements mounted thereon and adapted to support a vehicle wheel, a latch pivotally mounted upon said carriage for locking the latter against traveling movement, and a trip connected with said latch and positioned to be engaged by a wheel driven onto said carriage, whereby the latch is rendered inoperative to permit the carriage to be advanced by said wheel.

4. In a brake testing apparatus, a carriage having a pair of rollers mounted thereon adapted to support a vehicle wheel, means for locking said carriage against traveling movement, and means positioned to be engaged by a wheel driven onto said rollers whereby said locking means is rendered inoperative to permit the carriage to be advanced by said wheel.

5. In a brake testing apparatus, a carriage having a pair of rollers mounted thereon adapted to support a vehicle wheel, means for locking the carriage against traveling movement, and means positioned between said rollers and operatively connected with said locking means and adapted to be engaged by a wheel driven onto said rollers, whereby said locking means will be operated to release the carriage and permit the latter to be advanced by said wheel.

6. In a brake testing apparatus, a carriage having a pair of rollers mounted thereon and adapted to support a vehicle wheel, a latch pivotally mounted upon said carriage for locking the latter against traveling movement, and a trip connected with said latch and positioned to be engaged by a wheel driven onto said rollers, whereby the latch is rendered inoperative to permit the carriage to be advanced by said wheel.

7. In a brake testing apparatus, a frame, wheel supporting rollers mounted in said frame in spaced relation, a ramp for guiding the wheel onto said rollers, a carriage having a pair of rollers mounted thereon and adapted to support a vehicle wheel, means for locking said carriage against traveling movement, when positioned adjacent to said frame, and a trip positioned to be engaged by a wheel driven onto said carriage whereby said locking means is rendered inoperative to permit the carriage to be advanced by said wheel.

8. In a brake testing apparatus, a frame, vehicle wheel supporting rollers mounted thereon in spaced relation, means for guiding a vehicle wheel onto said rollers, a carriage mounted for traveling movement relatively to said frame, a pair of rollers mounted on said carriage and adapted to support a vehicle wheel, a latch pivotally mounted on the carriage adapted to lock the latter against traveling movement, when positioned adjacent to said frame, and a trip connected with said latch and positioned to be engaged by a wheel driven onto said carriage, whereby said latch is moved into inoperative position to permit the carriage to be moved forwardly by said wheel.

9. In a brake testing apparatus, a frame, wheel supporting rollers mounted in said frame in spaced relation, means for guiding the wheel onto said rollers, a carriage adapted to support a vehicle wheel, means for locking said carriage against traveling movement, when positioned adjacent to said frame, a trip positioned to be engaged by a wheel driven onto said carriage whereby said locking means is rendered inoperative to permit the carriage to be advanced by said wheel, and means by which said locking means may automatically return to carriage locking position, when the carriage is returned to its normal position and the wheel is removed therefrom.

10. In a brake testing apparatus, a frame, vehicle wheel supporting rollers mounted thereon in spaced relation, means for guiding a vehicle wheel onto said rollers, a carriage normally positioned adjacent to said frame, a pair of rollers on said carriage adapted to support a vehicle wheel, a latch pivotally mounted on the carriage for locking the latter against traveling movement, when positioned adjacent to said frame, a trip connected with said latch and positioned to be engaged by a wheel driven onto said carriage, whereby said latch is moved into inoperative position to permit the carriage to be moved forwardly by said wheel, and means whereby said latch will automatically move into carriage locking position, when the carriage is returned to its normal position adjacent to said frame and the wheel is removed therfrom.

11. In a brake testing apparatus, a frame, a pair of wheel supporting rollers mounted thereon in spaced relation, a ramp for guiding a vehicle wheel onto said rollers, a carriage normally positioned adjacent to said frame and mounted for traveling movement relatively thereto, said carriage being adapted to receive and support a wheel of the vehicle, means for locking said carriage in its normal position adjacent to said frame, a bridge member secured to and movable with the carriage and normally positioned over the rollers on said frame to guide a wheel of the vehicle over said rollers onto said carriage, and means operable to release the locking means, when a wheel is driven on the carriage.

12. In a brake testing apparatus, a frame, a pair of wheel supporting rollers mounted thereon in spaced relation, a ramp for guiding a vehicle wheel onto said rollers, a carriage normally positioned adjacent to said frame and mounted for traveling movement relatively thereto, said carriage being adapted to support a wheel of the vehicle, means for locking said carriage in position adjacent to said frame, a bridge member immovably secured on one end of the carriage and positioned over the rollers on said frame, when the carriage is in its normal position, whereby said bridge member may guide a wheel of the vehicle over the rollers of said frame onto said carriage, said rollers providing a support for said bridge member, when a wheel passes thereover, and means associated with said locking means and adapted to release the same, when a wheel is driven on the carriage.

13. In a brake testing apparatus, a frame, a pair of wheel supporting rollers mounted thereon, a ramp for guiding a vehicle wheel onto said rollers, a carriage having a pair of rollers mounted thereon and adapted to receive and support a vehicle wheel, means for locking said carriage against traveling movement, when positioned adjacent to said frame, and a bridge member supported on said carriage and positioned over the rollers on said frame in alinement with said ramp, when the carriage is positioned adjacent to said frame, whereby it may guide a vehicle wheel over the rollers on said frame and onto said carriage, and means on the carriage adapted to be engaged by the vehicle wheel to cause the release of said locking means and permit the carriage to be moved by the vehicle wheel positioned thereon.

14. In a brake testing apparatus, a frame, wheel supporting rollers mounted thereon in spaced relation, means for guiding a vehicle wheel onto said rollers, a carriage mounted for traveling movement and adapted to receive and support a vehicle wheel, means for normally securing the carriage in position adjacent to said frame, means for guiding a vehicle wheel over the rollers on said frame and movable with the carriage, and means made operable by a vehicle wheel driven onto the carriage, to effect the release of said securing means.

15. In a brake testing apparatus, a frame, wheel supporting rollers mounted thereon in spaced relation, a ramp for guiding a vehicle wheel onto said rollers, a carriage mounted for traveling movement and adapted to receive and support a vehicle wheel, means normally securing the carriage in position adjacent to said frame, means on the carriage for guiding a vehicle wheel over the rollers on said frame and onto said carriage, means associated with said securing means, whereby a wheel driven on the carriage will effect the release of the securing means, and means for relatively rotating one of said rollers to rotate the wheel supported thereby against the resistance of its brake to determine the brake resistance.

16. In a brake testing apparatus, a frame, wheel supporting rollers mounted thereon in spaced relation, a ramp for guiding a vehicle wheel onto said rollers, a carriage comprising a pair of rollers adapted to receive and support a vehicle wheel, said carriage being adapted to be moved forwardly and backwardly by a wheel positioned thereon, means for positively securing the carriage against movement when positioned adjacent to said frame, means on the carriage for guiding a vehicle wheel over the rollers on said frame and onto said carriage, means for relatively rotating one of the rollers of said frame and also one of the rollers of said carriage and whereby the brake resistance of the wheel brakes may be determined, and means for locking one of the rollers of said frame against rotation in one direction to permit the vehicle positioned thereon to be driven off said rollers, and means for releasing said securing means, when a wheel is driven on the carriage.

17. A brake testing apparatus, a frame, rollers mounted thereon in spaced relation and adapted to support the rear wheel of an automobile, a carriage adapted to receive and support a front wheel of the vehicle, said carriage normally being positioned adjacent to said frame, means for locking said carriage in its normal position, means for guiding the front wheel of the vehicle over the rollers on said frame, means on the carriage adapted to be engaged by the vehicle wheel to release the locking means whereby the carriage may be moved forwardly by the front wheel of the vehicle positioned thereon to permit the rear wheel of the vehicle to be advanced to a position upon the rollers of said frame, and means for relatively rotating one of the rollers on said frame against the resistance of the brakes of the vehicle to determine the brake resistance.

18. In a brake testing apparatus, a frame, rollers mounted thereon in spaced relation and adapted to support the rear wheel of an automobile, a carriage having a pair of rollers mounted thereon adapted to receive and support a front wheel of the vehicle, said carriage normally being positioned adjacent to said frame, means for locking said carriage in its normal position, means for guiding the front wheel of the vehicle over the rollers on said frame, means on the carriage adapted to be engaged by the vehicle wheel to release the locking means whereby the carriage may be moved forwardly by the front wheel of the vehicle positioned thereon, to permit the rear wheel of the vehicle to be advanced to a position upon the rollers of said frame, means for relatively rotating one of the rollers on said frame and also one of the rollers of said carriage against the resistance of the brakes of the vehicle to determine the brake resistance, and means for locking one of the rollers of said frame against rotation in one direction, whereby the vehicle wheel supported thereon may be driven off said rollers by the power of the vehicle.

19. In a brake testing apparatus, a carriage having rollers mounted thereon and adapted to receive and support a vehicle wheel provided with a brake, means for positively locking the carriage against traveling movement, in the absence of a vehicle wheel thereon, means for testing the brake resistance of the vehicle wheel brake while supported on said rollers, and means rendered operable by position of a vehicle wheel on the carriage, to thereby effect the release of the locking means.

20. In a brake testing apparatus, a carriage having rollers mounted thereon and adapted to receive and support the wheel of an automobile provided with a brake, means for positively locking the carriage against traveling movement, in the absence of a vehicle wheel thereon, means for tseting the brake resistance of the vehicle wheel brake while supported on said rollers, and means made operable by positioning of a vehicle wheel on the carriage to automatically effect the release of the locking means.

ADELBERT C. ANDERSON.
WALLACE R. STRANDBERG.